United States Patent
VonBergen et al.

(10) Patent No.: US 8,160,928 B2
(45) Date of Patent: Apr. 17, 2012

(54) NETWORK-BASED COMMERCE FACILITY OFFER MANAGEMENT METHODS AND SYSTEMS

(75) Inventors: Renée Gentry VonBergen, San Jose, CA (US); Erik Rannala, San Francisco, CA (US); George Liang, Campbell, CA (US); Maura K. Randall, San Jose, CA (US); David Raccah, San Jose, CA (US); Jennifer Kozenski, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 1460 days.

(21) Appl. No.: 11/040,721

(22) Filed: Jan. 21, 2005

(65) Prior Publication Data
US 2006/0167756 A1 Jul. 27, 2006

(51) Int. Cl.
*G06Q 30/00* (2012.01)
(52) U.S. Cl. .......................................... 705/26.1; 705/37
(58) Field of Classification Search .................. 717/100; 707/100; 705/26, 37, 26.1
See application file for complete search history.

(56) References Cited

U.S. PATENT DOCUMENTS

| | | | |
|---|---|---|---|
| 5,835,896 A | 11/1998 | Fisher et al. | |
| 6,041,308 A | 3/2000 | Walker et al. | |
| 6,085,169 A | 7/2000 | Walker et al. | |
| 6,108,639 A | 8/2000 | Walker et al. | |
| 6,134,534 A | 10/2000 | Walker et al. | |
| 6,240,396 B1 | 5/2001 | Walker et al. | |
| 6,356,878 B1 | 3/2002 | Walker et al. | |
| 6,484,153 B1 | 11/2002 | Walker et al. | |
| 6,510,418 B1 | 1/2003 | Case et al. | |
| 6,594,633 B1 * | 7/2003 | Broerman | 705/313 |
| 6,643,660 B1 * | 11/2003 | Miller et al. | 707/100 |
| 6,789,252 B1 * | 9/2004 | Burke et al. | 717/100 |
| 7,191,147 B2 * | 3/2007 | Heene et al. | 705/14.51 |
| 7,197,476 B2 * | 3/2007 | Le et al. | 705/26 |
| 7,340,429 B2 * | 3/2008 | Maltzman | 705/37 |
| 2002/0069151 A1 * | 6/2002 | Casper | 705/37 |
| 2004/0243478 A1 * | 12/2004 | Walker et al. | 705/26 |
| 2005/0010457 A1 * | 1/2005 | Ettinger, Jr. | 705/7 |
| 2005/0091144 A1 * | 4/2005 | Longman et al. | 705/37 |
| 2005/0289042 A1 * | 12/2005 | Friesen | 705/37 |
| 2006/0122929 A1 * | 6/2006 | Schoen et al. | 705/37 |
| 2008/0010099 A1 * | 1/2008 | Walker et al. | 705/4 |
| 2009/0271290 A1 * | 10/2009 | Van Luchene et al. | 705/26 |

OTHER PUBLICATIONS

Reynolds, Stanley S. & Wooders, John, "Ascending Bid Auction with a Buy-Now Price"; Aug. 2002, University of Arizona, Tucson.*
Ben-Ameur, Houssein, et al., "Multi-item Auctions for Automatic Negotiation", *Cirano Working Papers—2002s-68*,(2002),1-22.

(Continued)

*Primary Examiner* — Yogesh C Garg
(74) *Attorney, Agent, or Firm* — Schwegman, Lundberg & Woessner, P.A.

(57) ABSTRACT

Various embodiments include systems, methods, and software to manage offers in a network-based commerce system. One embodiment includes providing sellers an option when listing an item for sale to receive best offers for the item from buyers. This embodiment further includes receiving best offers submitted by offerees via the network-based commerce system and notifying sellers of received best offers. Some embodiments further include providing sellers an option to accept, reject, or ignore the individual best offers received. In some such embodiments, ignored best offers expire after a period, such as 48 hours. Yet further embodiments include notifying offerees of acceptance or rejection of their submitted best offers.

11 Claims, 12 Drawing Sheets

OTHER PUBLICATIONS

Ben-Ameur, Houssein, et al., "Multiagent auctions for multiple items", *Proceedings of the Third International Bi-Conference Workshop on Agent-Oriented Information Systems AOIS-2001*, Montreal, (May 28, 2001),1-7.

Stricker, Claude, et al., "Market-Based Workflow Management for Supply Chains of Services", *33rd Hawaii International Conference on System Sciences-vol. 6*, (2000),1-10.

Stroebel, Michael, "Effects of Electronic Markets on Negotiation Processes", *Proceedings of the 8th European Conference on Information Systems (ECIS 2000)*, (2000),8 pgs.

Zacharia, Giorgos, et al., "An agent system for comparative shopping at the point of sale", *Proceedings of the European Conference on Multimedia and e-commerce*, Bordeaux France. (Sep. 1998),1-14.

* cited by examiner

NETWORK-BASED COMMERCE FACILITY OFFER MANAGEMENT METHODS AND SYSTEMS

COPYRIGHT NOTICE

Contained herein is material that is subject to copyright protection. The copyright owner has no objection to facsimile reproduction of the patent disclosure by any person as it appears in the Patent and Trademark Office patent files or records, but otherwise reserves all rights to the copyright whatsoever.

TECHNICAL FIELD

The present application relates generally to network-based commerce, more particularly to network-based commerce facility offer management methods and systems.

BACKGROUND

Electronic commerce that utilizes the Internet to sell goods and services to customers has been increasing in its scope and scale at increasing rates. Merchants and other sellers of goods and services are increasingly in search of new mechanisms of listing their offered goods and services to leverage this growth in electronic commerce.

However, despite this growth in electronic commerce, sellers and buyers have been reluctant when dealing with certain types of products and services because current electronic commerce mechanisms do not accurately reflect non-electronic commerce transaction process. As a result, perceptions exist that sellers do not obtain maximized prices for their products or services and do not have control over the final selling price. In addition, some buyers are not comfortable with current electronic commerce processes, such as online auctions, which do not resemble most non-electronic transaction processes.

Further challenges exist for sellers and buyers working to ensure they maximize their positions in transactions. Current processes only provide sellers with the ability to set terms of sale. Because of a lack of control over transaction terms, some buyers are reluctant to purchase, or even consider, an offered product or service. This reluctance has a constraining effect on electronic commerce.

SUMMARY

The below described embodiments of the present invention are directed to network-based commerce facility offer management methods and systems.

According to one embodiment, there is a network-based commerce system. The system includes a presentation server to present a listing of an item (e.g., a good or service) for sale to a buying-user via the system to solicit a best offer from the user for the item for sale and to present pending best offers from buying-users received by the offer server to the selling-user. The system further includes an offer server to monitor a best offer submitted by the buying-user and communicate that offer via the system to a selling-user.

Another embodiment includes a method for electronic listing within an e-commerce system. The method includes creating a seller listing for a quantity of an item for sale, wherein the listing includes an offer option for a buyer to make an offer for the item, and posting the seller listing on the e-commerce system. The method further includes receiving an offer from each of one or more buyers for the item, receiving an acceptance from the seller of one or more of the offers, and ending the listing of the item offered for sale if the number of accepted offers is equal to the quantity of the item for sale. One such embodiment further includes generating an electronic communication to the seller upon posting of the seller listing on the ecommerce system, the communication confirming the posting was successful and generating an electronic communication to a buyer upon receipt of an offer from the buyer, the electronic communication confirming the offer was successfully received by the electronic commerce system. This embodiment also includes generating an electronic communication to the seller upon receipt of the offer from the buyer, the electronic communication notifying the seller of the offer, generating an electronic communication to the buyer upon acceptance or rejection of the buyer's offer, generating an electronic communication to the buyer when an offer expires or can no longer be fulfilled because the seller's inventory has reached zero.

A further embodiment provides a system for providing seller listings within an ecommerce system. This system includes a means for posting a seller listing for an item for sale on the ecommerce system and a means for receiving an offer for the item for sale from a buyer. The system further includes a means for receiving a response to the offer for the item for sale, wherein a response includes either an acceptance or rejection of the offer for the item for sale and a means for ending the listing upon receiving a response specifying an acceptance of the offer for the item for sale.

Another embodiment provides an electronic marketplace. The electronic marketplace includes an electronic listing of a finite number of substantially identical items for sale by a seller, wherein the listing provides buyers an ability to make a best offer for an item for sale, further wherein the electronic listing, at the seller's discretion, includes a limit on the number of best offers individual buyers can make, and wherein a listing is ended if the remaining finite number of substantially identical items for sale equals zero.

Yet a further embodiment provides a method of receiving a listing of an item for sale within an electronic marketplace. The method includes receiving descriptive information about an item from a seller, receiving an amount a seller is willing to sell the item for, receiving an indication the seller is willing to accept best offers for the item from buyers, and posting the item for sale within the electronic marketplace.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Network-based commerce facility offer management methods and systems are described. In various embodiments, as described below, this facility provides sellers an option to accept best offers from buyers for product and service offerings. The offers can include additional binding terms specified by a buyer and a seller can choose an offer to accept. Various other aspects and combinations of aspects are described in greater detail in the following description. Within this description, for purposes of explanation, numerous specific details are set forth in order to provide a thorough understanding of the present invention. It will be evident, however, to one skilled in the art that the present invention can be practiced without these specific details.

Platform Architecture

Figure 1:
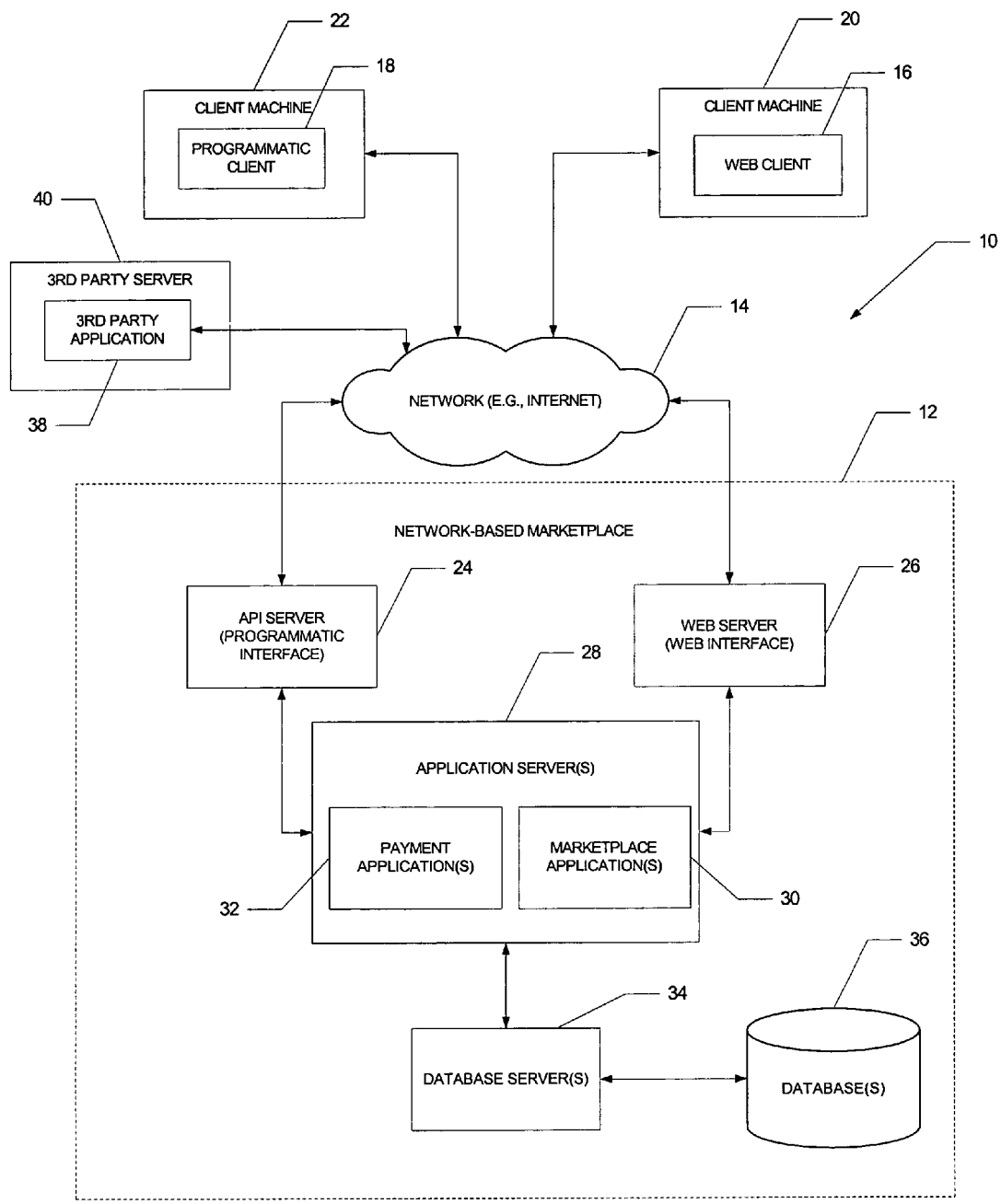
FIG. 1 is a network diagram depicting a system according to one example embodiment of the present invention, having a client-server architecture.

FIG. 1 is a network diagram depicting a system 10, according to one example embodiment of the present invention. This embodiment is built upon a client-server architecture. A commerce platform, in the example form of a network-based marketplace 12, provides server-side functionality, via a network 14 (e.g., the Internet) to one or more clients. FIG. 1 illustrates, for example, a web client 16 (e.g., a browser, such as the Internet Explorer browser developed by Microsoft Corporation of Redmond, Washington State), and a programmatic client 18 executing on respective client machines 20 and 22.

Turning specifically to the network-based marketplace 12, an Application Program Interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more databases servers 34 that facilitate access to one or more databases 36.

Figure 2:
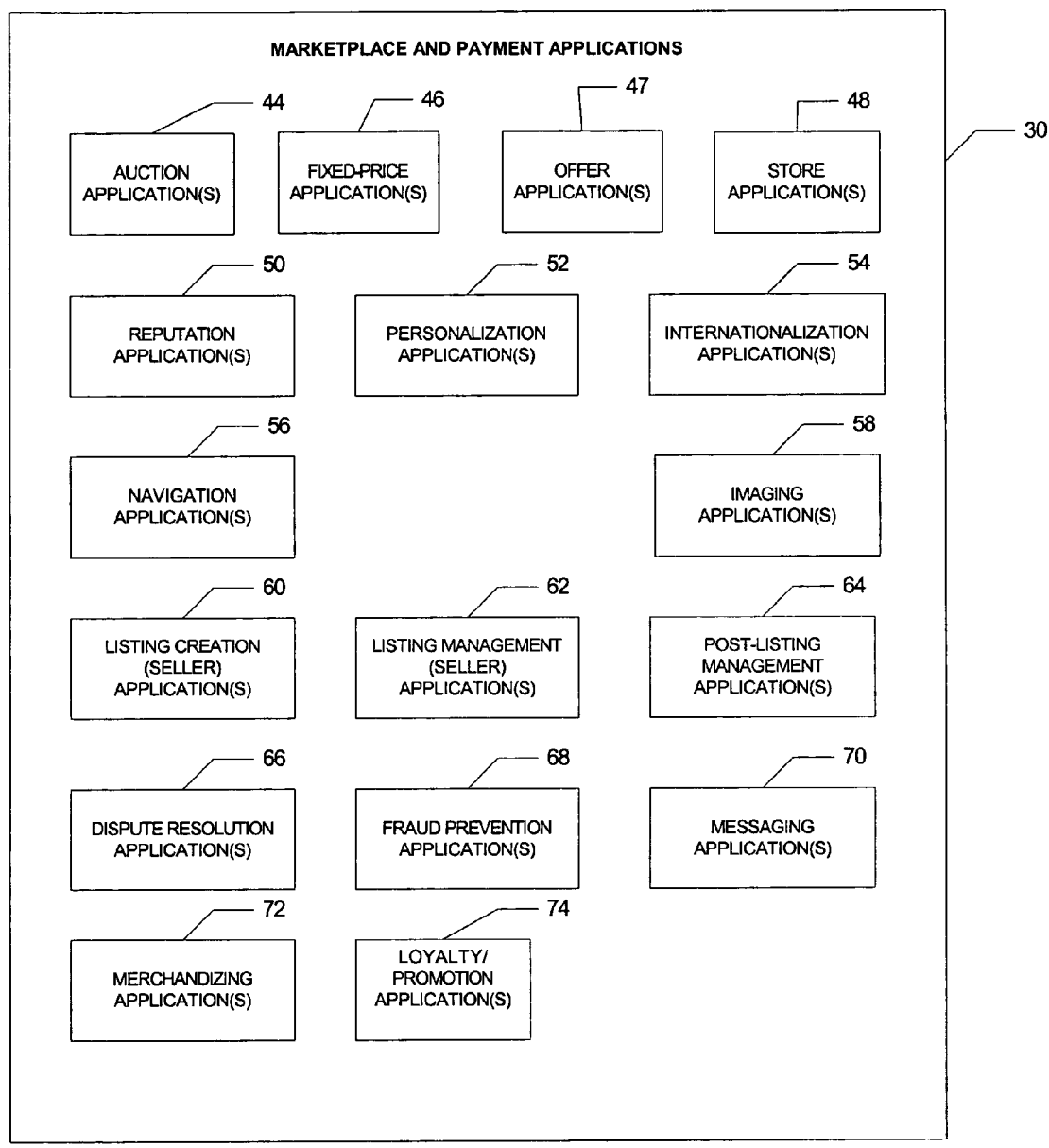
FIG. 2 is a block diagram illustrating multiple marketplace and payment applications in one example embodiment of the present invention.
Figure 3:
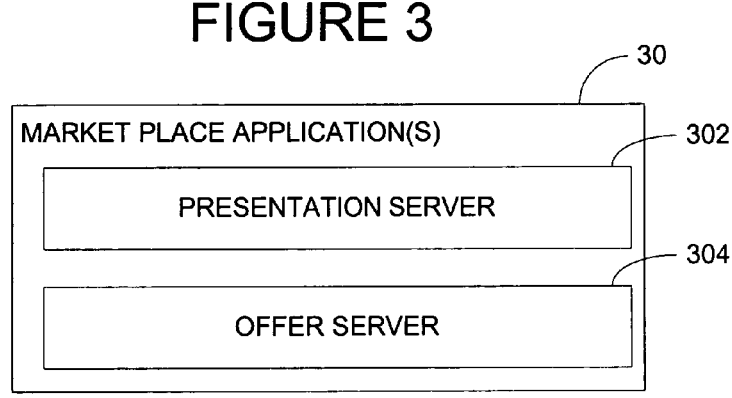
FIG. 3 is a detailed block diagram illustrating elements of marketplace applications in one example embodiment of the present invention.

The marketplace applications 30 provide a number of marketplace functions and services to users that access the marketplace 12. Further detail of example marketplace applications 30 are illustrated in FIG. 2 and FIG. 3 and described below. Returning to FIG. 1, the payment applications 32 likewise provide a number of payment services and functions to users. The payment applications 30, in some embodiments, allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 1 to both form part of the network-based marketplace 12, it will be appreciated that, in alternative embodiments of the present invention, the payment applications 32 can form part of a payment service that is separate and distinct from the marketplace 12.

Further, while the system 10 shown in FIG. 1 employs a client-server architecture, the present invention is of course not limited to such an architecture, and could equally well find application in a distributed, or peer-to-peer, architecture system. The various marketplace and payment applications 30 and 32 can also be implemented as standalone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 can, for example, be a seller application (e.g., the TurboLister application developed by eBay Inc., of San Jose, Calif.) to enable sellers to author and manage listings on the marketplace 12 in an off-line manner, and to perform batch-mode communications between the programmatic client 18 and the network-based marketplace 12.

FIG. 1 also illustrates a third party application 38, executing on a third party server machine 40, as having programmatic access to the network-based marketplace 12 via the programmatic interface provided by the API server 24. For example, the third party application 38 can, utilizing information retrieved from the network-based marketplace 12, support one or more features or functions on a website hosted by the third party. The third party website can, for example, provide one or more promotional, marketplace or payment functions that are supported by the relevant applications of the network-based marketplace 12.

Marketplace Applications

FIG. 2 is a block diagram illustrating multiple marketplace and payment applications 30 in one example embodiment of the present invention. The marketplace and payment applications 30 are part of the network-based marketplace 12. The marketplace 12 can provide a number of listing and price-setting mechanisms whereby a seller can list goods or services for sale, a buyer can express interest in or indicate a desire to purchase such goods or services, and a price can be set for a transaction pertaining to the goods or services. To this end, the marketplace applications 30 are shown to include one or more auction applications 44 which support auction-format listing and price setting mechanisms (e.g., English, Dutch, Vickrey, Chinese, Double, Reverse auctions etc.). The various auction applications 44 can also provide a number of features in support of such auction-format listings, such as a reserve price feature whereby a seller can specify a reserve price in connection with a listing and a proxy-bidding feature whereby a bidder can invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) can be offered in conjunction with an auction-format listing, and allow a buyer to purchase goods or services, which are also being offered for sale via an auction, for a fixed-price that is typically higher than the starting price of the auction.

A number of offer applications 47 support listing formats that solicit offers from prospective buyers for listed items. The offer applications 47 provide a listing to a buyer and solicit an offer for the offered product or service including a price the buyer is willing to pay for the item. In some embodiments, the buyer can optionally include one or more additional terms of the offer that will be binding upon the seller upon acceptance. Buyer offers, in some embodiments, expire after a period such as 48 hours. Buyer offers can also be rescinded, in some embodiments, provided the offer has not already been accepted. In some embodiments, the buyer is limited to making a finite number of offers, such as one or two offers. This forces a buyer to make a best offer for the item or miss the opportunity to purchase the item. Offers received by the offer applications 47 are then presented to sellers that can optionally accept, reject, or ignore then offers. Ignored offers, in embodiments in which offers expire after a period are automatically rejected after that period. Further, a buyer can be limited to having only a single pending offer for a listed item.

The number of offers a buyer is limited to making, in some embodiments, is configurable to provide different buyers a different number of offer opportunities. For example, a listing within a certain country may allow only a single offer, while a listing in another country may allow two or more offers. Another example may allow a certain number of offers based on the type of product listed. This flexibility allows administrators and sellers to customize listings to mimic marketplace transaction formats and associated haggling or lack thereof based on a number of factors including localized culture and business practices.

Store applications 48 allow sellers to group their listings within a "virtual" store, which can be branded and otherwise personalized by and for the sellers. Such a virtual store can also offer promotions, incentives and features that are specific and personalized to a relevant seller.

Reputation applications 50 allow parties that transact utilizing the network-based marketplace 12 to establish, build, and maintain reputations, which can be made available and published to potential trading partners. Consider that where, for example, the network-based marketplace 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based marketplace 12 over time. Other potential trading partners can then reference such a reputation for the purposes of assessing credibility and trustworthiness.

Personalization applications 52 allow users of the marketplace 12 to personalize various aspects of their interactions with the marketplace 12. For example, a user can, utilizing an appropriate personalization application 52, create a personalized reference page at which information regarding transactions to which the user is (or has been) a party can be viewed. Further, a personalization application 52 can enable a user to personalize listings and other aspects of their interactions with the marketplace 12 and other parties.

In one embodiment, the network-based marketplace 12 can support a number of marketplaces that are customized, for example, for specific geographic regions. A version of the marketplace 12 can be customized for the United Kingdom, whereas another version of the marketplace 12 can be customized for the United States. Each of these versions, also referred to as internationalization application(s) 54, can operate as an independent marketplace, or can be customized (or internationalized) presentations of a common underlying marketplace.

Navigation of the network-based marketplace 12 can be facilitated by one or more navigation applications 56. For example, a search application enables keyword searches of listings published via the marketplace 12. A browse application allows users to browse various category, catalogue, or inventory data structures according to which listings can be classified within the marketplace 12. Various other navigation applications can be provided to supplement the search and browsing applications.

In order to make listings, available via the network-based marketplace 12, as visually informing and attractive as possible, the marketplace applications 30 can include one or more imaging applications 58 which users can utilize to upload images for inclusion within listings. An imaging application 58 also operates to incorporate images within viewed listings. The imaging applications 58 can also support one or more promotional features, such as image galleries that are presented to potential buyers. For example, sellers can pay an additional fee to have an image included within a gallery of images for promoted items.

Listing creation applications 60 allow sellers conveniently to author listings pertaining to goods or services that they wish to transact via the marketplace 12, and listing management applications 62 allow sellers to manage such listings. Specifically, where a particular seller has authored and/or published a large number of listings, the management of such listings can present a challenge. The listing management applications 62 provide a number of features (e.g., auto-relisting, inventory level monitors, etc.) to assist the seller in managing such listings. One such feature includes providing sellers with a listing of all offers received for item. Such a listing can provide sellers with the ability to quickly view the offers and quickly reject and accept offers. One or more post-listing management applications 64 also assist sellers with a number of activities that typically occur post-listing. For example, upon completion of an auction facilitated by one or more auction applications 44, a seller may wish to leave feedback regarding a particular buyer. To this end, a post-listing management application 64 can provide an interface to one or more reputation applications 50 to allow the seller conveniently to provide feedback regarding multiple buyers to the reputation applications 50.

Dispute resolution applications 66 provide mechanisms whereby disputes arising between transacting parties can be resolved. For example, the dispute resolution applications 66 can provide guided procedures whereby the parties are guided through a number of steps in an attempt to settle a dispute. In the event that the dispute cannot be settled via the guided procedures, the dispute can be escalated to a third party mediator or arbitrator.

A number of fraud prevention applications 68 implement various fraud detection and prevention mechanisms to reduce the occurrence of fraud within the marketplace 12.

Messaging applications 70 are responsible for the generation and delivery of messages to users of the network-based marketplace 12. Such messages, for example, can advise users of the status of listings at the marketplace 12 (e.g., providing "outbid" notices to bidders during an auction process or to provide promotional, merchandising information to users, offer received notices to sellers, and offer rejected or offer accepted/item purchased notices to buyers). Some such messages also include confirmation messages that bid or offers have been successfully received by the network-based marketplace and messages that an offer has been accepted, rejected, or expired. Yet further messages include messages informing a seller that an offer has been received for a product or service the seller has listed. In some embodiments, messages from the messaging application 70 are sent via email, while in other embodiments, the messages are delivered within the network-based marketplace 12 itself. Yet further embodiments include sending the message both by email and within the network-based marketplace 12.

Messages sent by the messaging applications 70 can also include invitations to make a further offer or bid for an item a message recipient has made an offer for or bid on. Such messages can include a link back to the same item the offer or bid was made for. These message can also, or alternatively, include a link to a similar item listed within the network-based marketplace 12 that a buyer could be interested in. This link is a recommendation to the buyer of another listed item along with an invitation to make an offer for, bid upon, or otherwise purchase the alternate item.

Merchandising applications 72 support various merchandising functions that are made available to sellers to enable sellers to increase sales via the marketplace 12. The merchandising applications 80 also operate the various merchandising features that can be invoked by sellers, and can monitor and track the success of merchandising strategies employed by sellers.

The network-based marketplace 12 itself, or one or more parties that transact via the marketplace 12, can operate loyalty programs that are supported by one or more loyalty/promotions applications 74. For example, a buyer can earn loyalty or promotions points for each transaction established and/or concluded with a particular seller, and be offered a reward for which accumulated loyalty points can be redeemed.

FIG. 3 is a detailed block diagram illustrating elements of marketplace applications 30 in one example embodiment of the present invention. The market place applications 30 include a presentation server 302 and an offer server 304.

The presentation server 302, in some embodiments, is a software application, or part thereof, executing on a programmable computer executing other software applications including other server applications. In other embodiments, the presentation server 302 is a programmable computer provided with the sole purpose of executing the presentation server 302 software.

The presentation server 302 is provided to present a listing of an item (e.g., goods or services) for sale to a buying-user via the network-based marketplace 12. In some embodiments, the listing is provided via a webpage to a user, such as a buyer, to solicit a best offer from the user for the item for sale. In some webpage embodiments, the presentation server 302 builds the webpage from data retrieved from a database, such as from the items table 94 illustrated in FIG. 4 and discussed below. Web pages built and provided by the presentation server 302 can include information about the item for sale such as a description and a picture of the item. In some other embodiments, the presentation server 302 includes any one or more of a web server, an e-mail server, an instant message server, an RSS server, a voice server and a fax server.

The presentation server 302 also presents pending offers from buying-users received by the offer server 304 to the selling-user. In some embodiments, the presentation server 302 presents received offers to the selling-user within a user interface.

The user interface can provide the selling-user the ability to reject and accept one or more offers. The user interface, in some embodiments, allows the selling-user to reject multiple offers simultaneously (e.g., in a batch). When a selling-user has listed more than one substantially identical item within a single listing, the selling user can use some embodiments of the user interface to accept multiple offers simultaneously. Other embodiments require sellers to accept multiple offers individually. The user interface provided can also include a text field wherein the selling user can enter text to be included with a notice to the buying-user that the buying-user's best offer is rejected or accepted.

The offer server 304, in some embodiments, is a software application, or part thereof, executing on a programmable computer executing other software applications including other server applications. In other embodiments, the offer server 304 is a programmable computer provided with the sole purpose of executing the offer server 304 software.

The offer server 304 is provided to receive and monitor an offer submitted by a user. The offer server 304 further communicates that received offer via the network-based marketplace 12 to a selling-user who has listed the item the offer was received for. The offer can also, or alternatively, be communicated to the selling-user via an email. In some embodiments, the offer is communicated to the selling-user via the messaging application(s) 70 as illustrated in FIG. 2.

Upon receipt of an offer acceptance or rejection by the offer server 304, a notice is communicated to the buying-user over the network-based marketplace 12 of the acceptance or rejection. That notice includes any text entered by the selling-user in the text field to be included with the notice.

In some further embodiments, the network-based marketplace 12 also includes a payment server, such as payment application(s) 32 illustrated in FIG. 2 and described above. In some such embodiments, the payment server processes payments for an accepted best offer upon the offer server 304 receiving a best offer acceptance from a selling-user.

Data Structures

Figure 4:
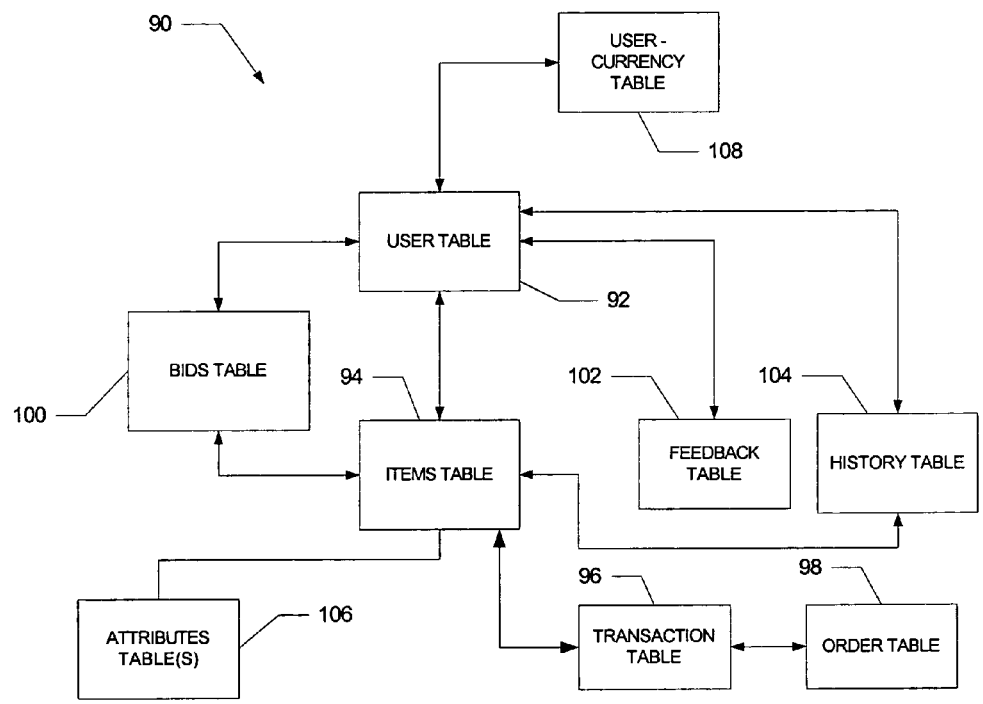
FIG. 4 is a high-level entity-relationship diagram in accordance with an example embodiment of the present invention.

FIG. 4 is a high-level entity-relationship diagram, illustrating various tables 90 that can be maintained within the databases 36 and that are utilized by and support the marketplace and payment applications 30 and 32. A user table 92 contains a record for each registered user of the network-based marketplace 12, and can include identifier, address, and financial instrument information pertaining to each registered user. A user can, it will be appreciated, operate as a seller, a buyer, or both, within the network-based marketplace 12. In one example embodiment of the present invention, a buyer may be a user that has accumulated value (e.g., commercial or proprietary currency stored in a user-currency table 108), and is then able to exchange the accumulated value for items that are offered for sale by the network-based marketplace 12.

The tables 90 also include an items table 94 in which are maintained item records for goods and services that are available to be, or have been, transacted via the marketplace 12. Each item record within the items table 94 may furthermore be linked to one or more user records within the user table 92, so as to associate a seller and one or more actual or potential buyers with each item record.

A transaction table 96 contains a record for each transaction (e.g., a purchase transaction) pertaining to items for which records exist within the items table 94.

An order table 98 is populated with order records, each order record being associated with an order. Each order, in turn, may be with respect to one or more transactions for which records exist within the transactions table 96.

Bid records within a bids table 100 each relate to a bid or offer received at the network-based marketplace 12 in connection with an auction-format or best-offer listing supported by an auction application 44 or offer application 47. Bid records can include data such as a buyer identifier, a listing identifier, a bid or offer amount, time of the offer or bid, an indication that the bid or offer has been rescinded, additional terms entered by a buyer, an indicator if the bid or offer was the winning bid or offer, and any other bid or offer specific data necessary or otherwise attributable to an offer or bid.

A feedback table 102 is utilized by one or more reputation applications 50, in one example embodiment, to construct and maintain reputation information concerning users. A history table 104 maintains a history of transactions to which a user has been a party. One or more attributes tables 106 record attribute information pertaining to items for which records exist within the items table 94. Considering only a single example of such an attribute, the attributes tables 106 may indicate a currency attribute associated with a particular item, the currency attribute identifying the currency of a price for the relevant item as specified in by a seller.

Platform

Figure 5:
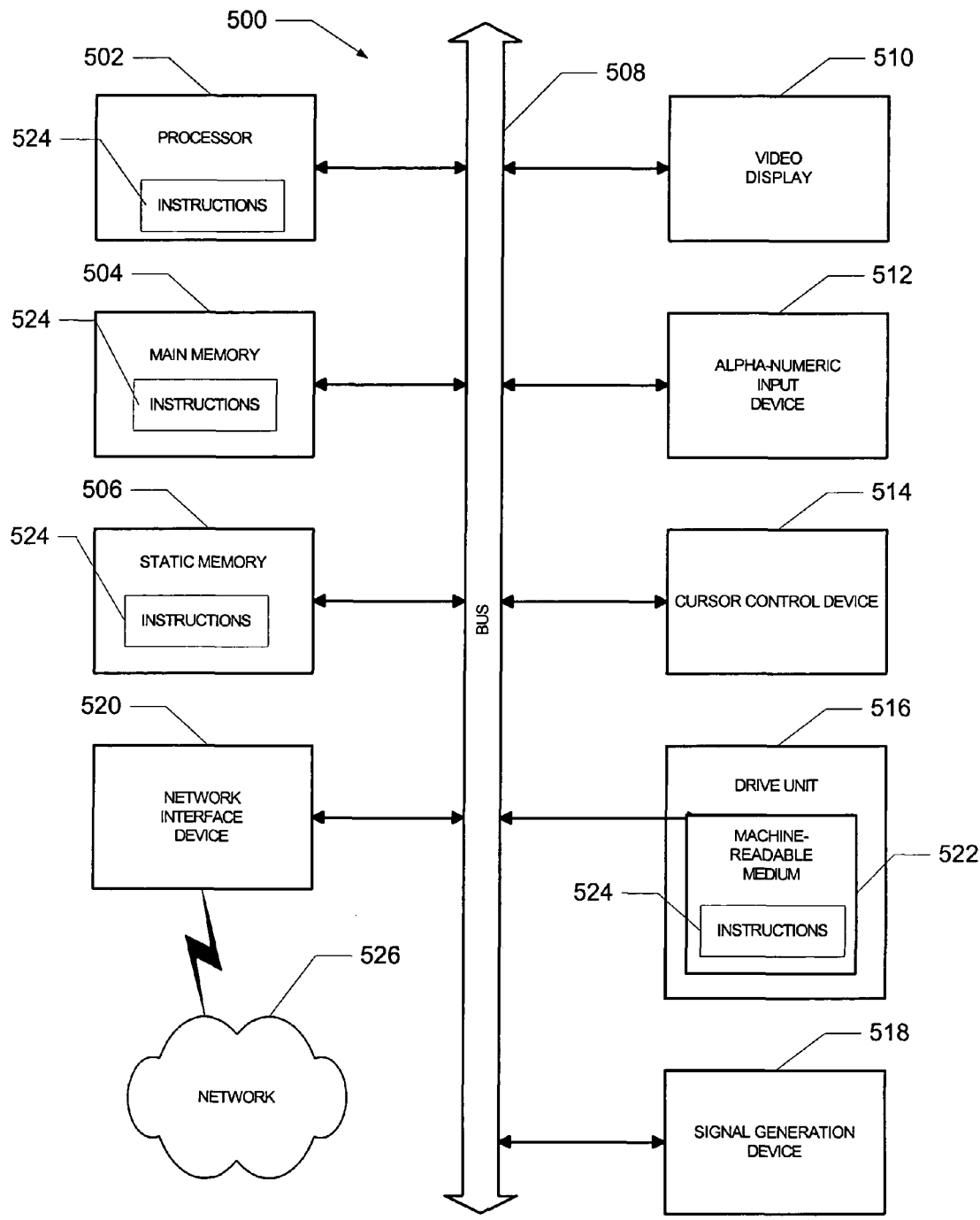
FIG. 5 is a block diagram illustrating a general programmable processing system in accordance with various example embodiments of the present invention.

FIG. 5 is a block diagram illustrating a general programmable processing machine, such as a computer system 500, in accordance with various embodiments of the present invention.

The computer system 500 includes a set of instructions 524 for causing the computer system 500 to perform any one or more of the methodologies discussed herein. In alternative embodiments, the computer system 500 operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU) a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions (e.g., software 524) embodying any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Flowcharts

Figure 6:
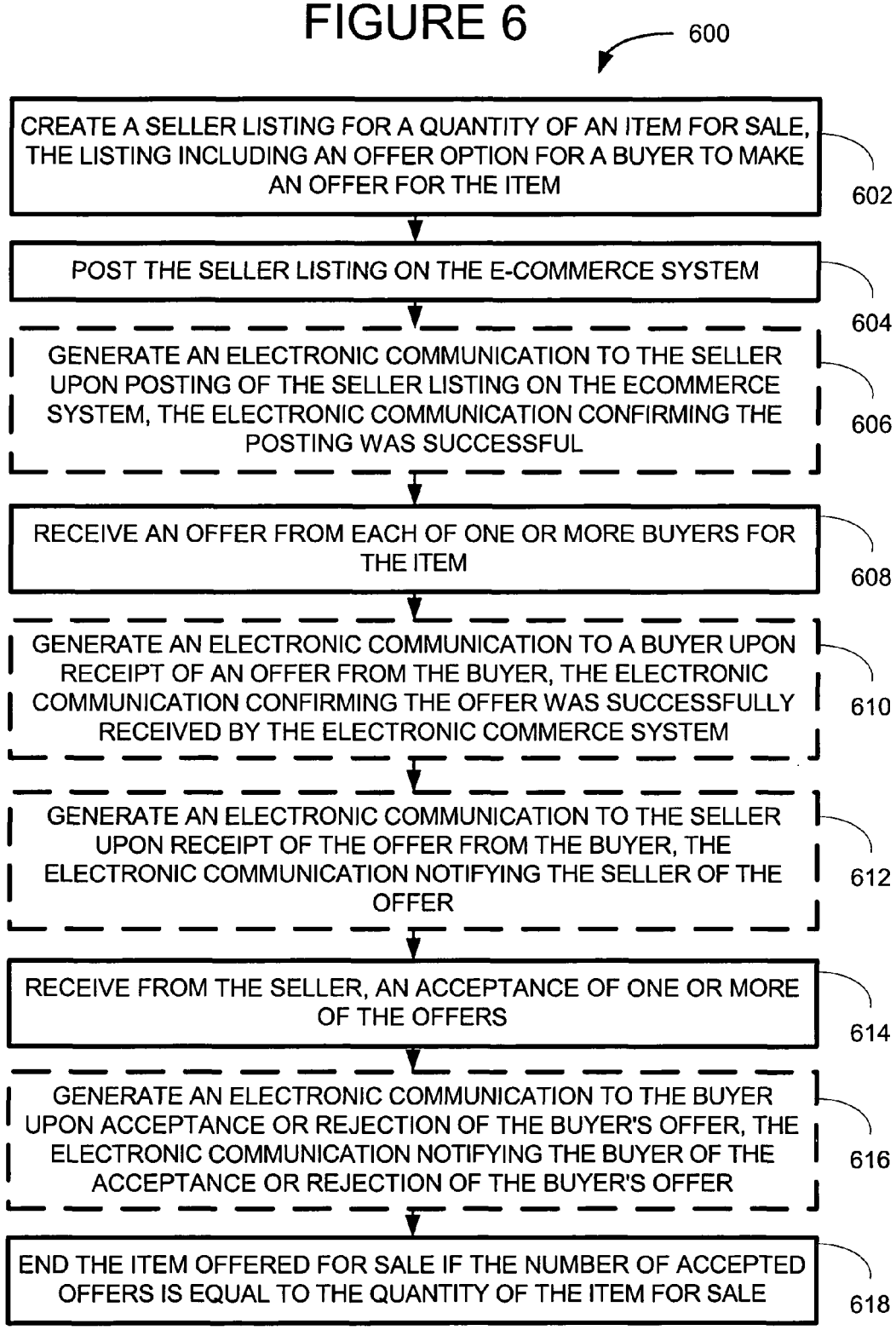
FIG. 6 is a process flow diagram according to one example embodiment of the present invention.

FIG. 6 is a process flow diagram illustrating a method 600, according to one example embodiment of the present invention. The method 600 relates to electronic listing within an e-commerce system, such as the network-based marketplace 12 of FIG. 1. The method 600 includes creating (block 602) a seller listing for a quantity of an item (e.g., a good or service) for sale wherein the listing includes an offer option for a buyer to make an offer for the item and posting (block 604) the seller listing on the e-commerce system. The method 600 further includes receiving (block 608) an offer from each of one or more buyers for the item and receiving (block 614) from the seller, an acceptance of one or more of the offers. The method 600 then ends (block 618) the listing of the item offered for sale if the number of accepted offers is equal to the quantity of the item for sale.

The method 600 also optionally includes generating (block 606) electronic communications upon the occurrence of certain events. Some such events may include generating (block 610) an electronic communication to the seller upon posting of the seller listing on the ecommerce system, the electronic communication confirming the posting was successful and to a buyer upon receipt of an offer from the buyer, the electronic communication confirming the offer was successfully received by the electronic commerce system. Some further events include generating (block 612) an electronic communication to the seller upon receipt of the offer from the buyer, the electronic communication notifying the seller of the offer and generating (block 616) an electronic communication to the buyer upon acceptance or rejection of the buyer's offer, the electronic communication notifying the buyer of the acceptance or rejection of the buyer's offer. In some embodiments, generating the electronic communications includes automatically generating and sending of email upon the occurrence of the event triggering the generating of the communication.

Some generated electronic communications, such as an email notifying a buyer that their offer has been rejected, include an invitation for the buyer to make another offer, to make a bid, or to purchase the item at a buyout price. Other example electronic communications may include an email notifying a buyer that their offer was accepted, or in an invitation in the form of a message and hyperlink to pay for the item. Other example electronic communications include one or more invitations and hyperlinks to perform other actions.

Some example embodiments of the method 600 also include limiting a buyer to making no more than a specified number of offers for a seller listing, such as one or two offers. Some received offers 608 include additional terms from a buyer and a received acceptance of such an offer binds the seller and the buyer to the additional terms.

Figure 7:
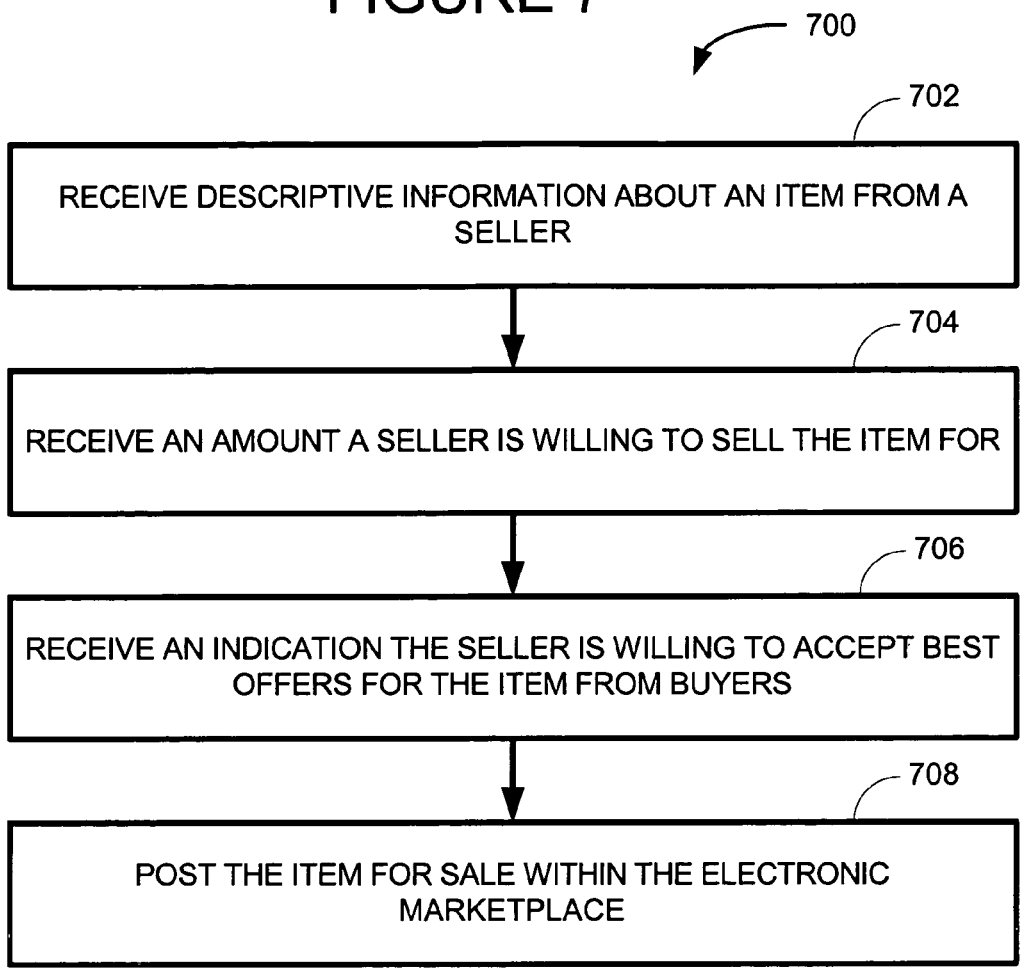
FIG. 7 is a process flow diagram according to one example embodiment of the present invention.

FIG. 7 is a process flow diagram according to one example embodiment of the present invention. The process flow diagram is of a method 700 of receiving a listing of an item for sale within an electronic marketplace, such as network-based marketplace 12 as illustrated in FIG. 1. A listing generated according to the method 700 is a buyout-type listing, such as a Buy-It-Now (BIN) listing within the eBay.com website, in combination with a best-offer listing as described herein. Other embodiment include a combination of one or more other types of product listings with a best-offer listing or an item that is solely a best-offer listing.

The method 700 includes receiving (block 702) descriptive information about an item from a seller and receiving (block 704) an amount for which a seller is willing to sell the item. The method 700 further includes receiving (block 706) an indication the seller is willing to accept best offers for the item from buyers and posting (block 708) the item for sale within the electronic marketplace.

In various embodiments of the method 700, the item for sale includes an automobile, a piece of jewelry, an electronic device, a service, or virtually any other type of goods or services.

User Interfaces

The following user interfaces are provided as examples of user interfaces according to various aspects within one or more embodiments of the present invention. In some embodiments, the user interfaces are web pages viewable and operable within a web browser application such as Internet Explorer developed by Microsoft Corporation of Redmond, Washington State. In other embodiments, the user interfaces are part of a stand alone application executable on a computer system that communicated over a network such as the TurboLister application developed by eBay Inc., of San Jose, Calif.

Figure 8:
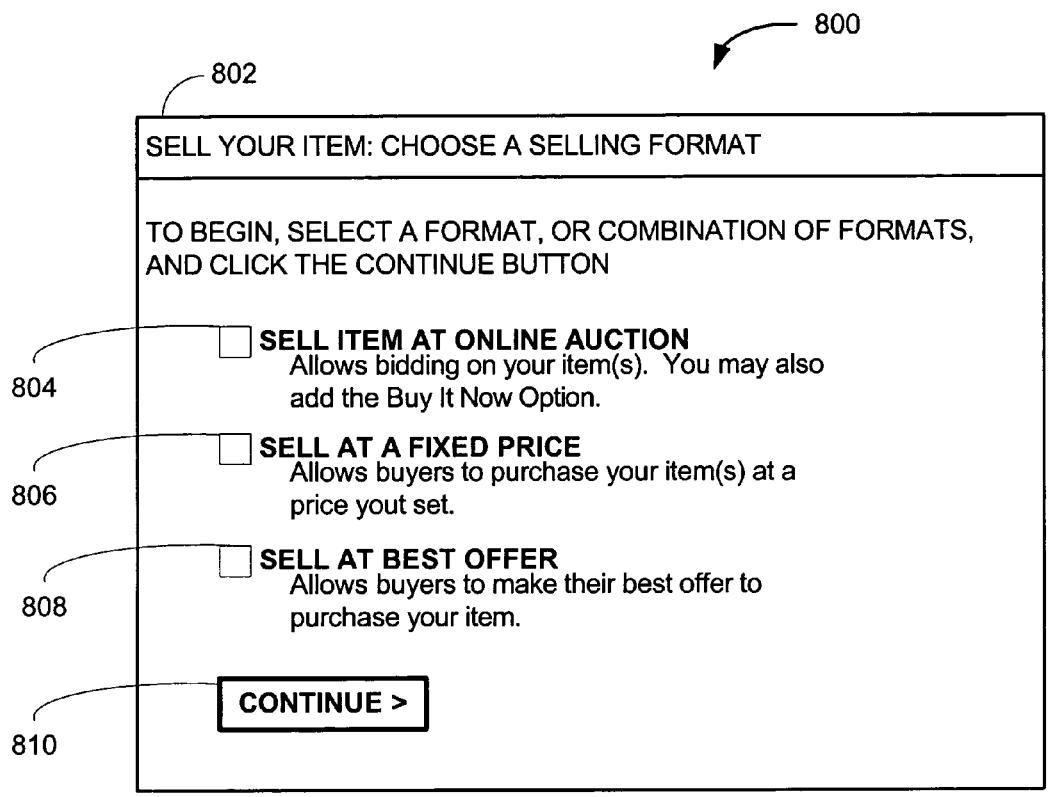
FIG. 8 is a block diagram of a user interface according to one example embodiment of the present invention.

FIG. 8 is a block diagram of a user interface 800 according to one example embodiment of the present invention. The user interface 800 is a beginning point for a seller to list an item within a network-based marketplace 12. The user interface 800 includes a title bar 802 that displays a title of the user interface. A title within the title bar 802 provides context to users as to the purpose or use of the user interface 800.

The user interface 800 includes a "SELL ITEM AT ONLINE AUCTION" selection item 804, a "SELL AT A FIXED PRICE" selection item 806, and a "SELL AT BEST OFFER" selection item 808. The user interface 800 further includes a submission item 810.

The selections items 804, 806, and 808 are illustrated as check boxes within the user interface 800, the selection of which indicate that a user listing an item desires that an item being listed be listed with the selected format(s). One or more selection items 804, 806, and 808 can be selected. In some embodiments, the "SELL AT BEST OFFER" selection item 808 can only be selected in combination with the "SELL AT FIXED PRICE" selection item 806. After selection of the one or more selection items 804, 806, and 808, a user selects the selection item 810 to cause the listing format selections to be submitted electronically over a network.

An example of when more than one of the selection items 804, 806, and 808 are selected includes a listing to sell an item at a fixed price, and under the best offer format. In such a case, a buyer can purchase the item immediately at the fixed price or the buyer can make an offer, which may or may not be accepted.

Another example is when a seller selects all of the selection items 804, 806, and 808 indicating the seller wants to utilize all of the formats. In such a scenario, an item is listed with a fixed price buyers can pay to purchase the item immediately or make a best offer. Further, buyers can make bids under the online auction format. If a buyer pays the fixed price or a seller accepts an offer, the listing is ended and the auction is stopped prior to completion. Otherwise, at the end of the auction period, the highest bidder wins the auction and can purchase the item at the winning bid price.

Figure 9:
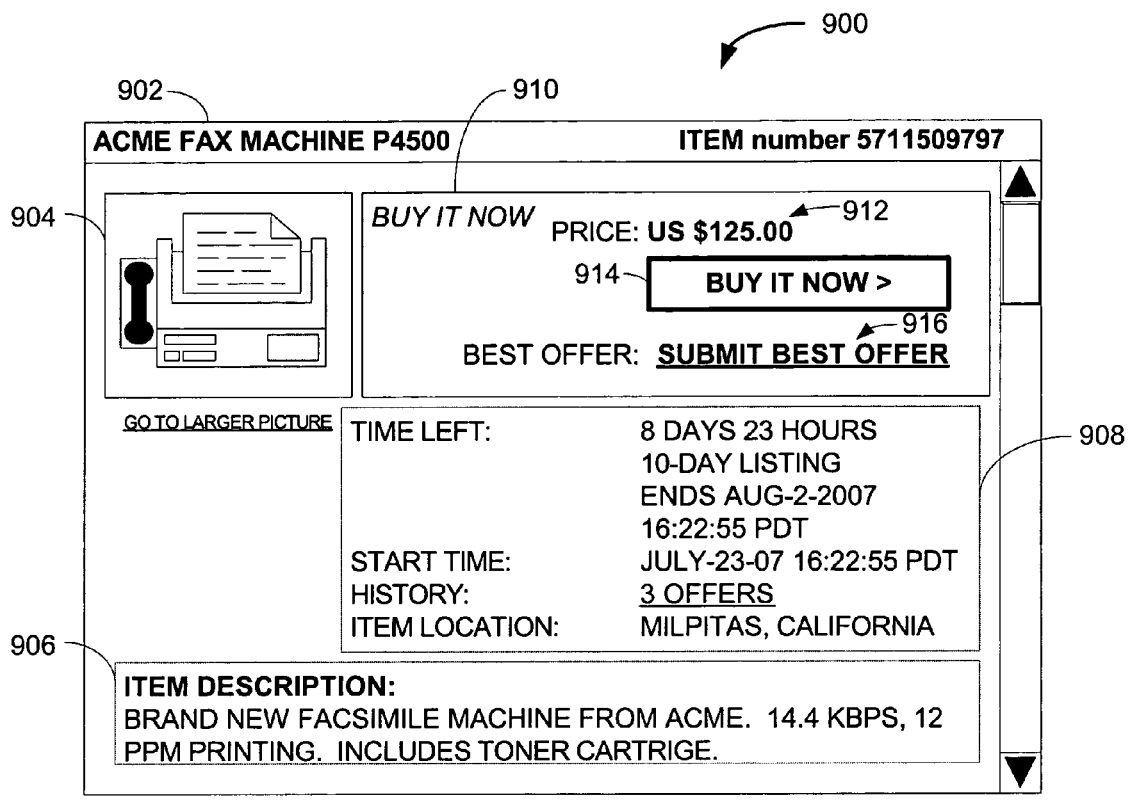
FIG. 9 is a block diagram of a user interface according to one example embodiment of the present invention.

FIG. 9 is a block diagram of a user interface 900 according to one example embodiment of the present invention. The user interface 900 is a view of a listing within an electronic marketplace, such as the network-based marketplace 12 of FIG. 1. The user interface 900 includes a title bar 902 and item information such as a picture 904 of the item and an item description 906. The user interface 900 further includes listing information 908 including information such as when the listing was made, when the listing ends, and various other items of information related to the listing. Additionally, the user interface includes a listing format portion 910 that includes information about the format of the listing.

The information about the listing format in the listing format portion 910, as illustrated includes a buyout price 912, buyout submission item 914, and a "Submit Best Offer" hyperlink 916. The buyout price 912 indicates that the item of the listing can be purchased immediately at a fixed price of the buyout price 912. The buyout submission item 914, when selected, causes the user interface to submit an indication that the user will purchase the item at the buyout price 912. The "Submit Best Offer" hyperlink 916, when selected causes the user interface to submit an indication the user wants to make an offer for the item. In some embodiments, selection of the "Submit Best Offer" hyperlink 916 causes another user interface, such as the user interface 1000 of FIG. 10, to be displayed to the user for use in submitting a best offer. Other example embodiments of the listing format portion 910 can include one or more text boxes in which a user can enter an amount of a bid for an auction format listing or an amount of a best offer and any additional terms of the offer.

Figure 10:
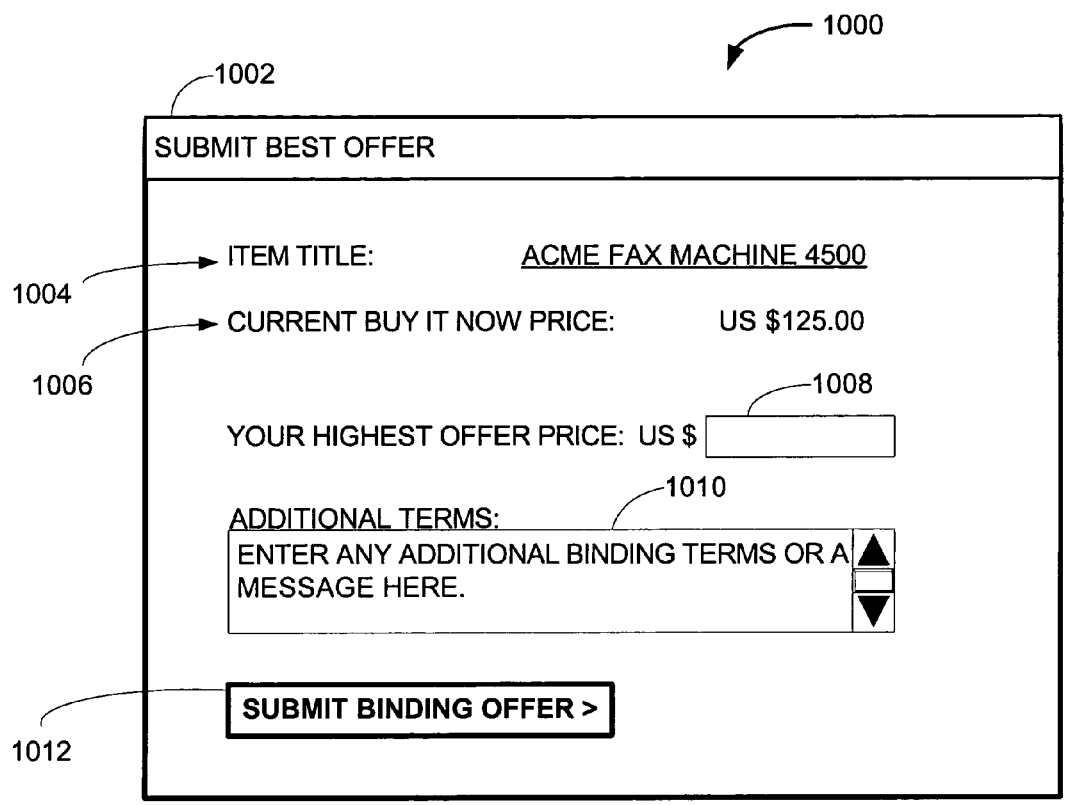
FIG. 10 is a block diagram of a user interface according to one example embodiment of the present invention.

FIG. 10 is a block diagram of a user interface 1000 according to one example embodiment of the present invention. The user interface 1000 accepts terms of a user's offer, such as a best offer, for a listed item. The user interface 1000 includes a title 1002, item identifying information 1004, and information of other listing formats of the listing 1006, such as a current buyout price. The user interface 1000 further includes an offer price input field 1008, an additional terms input field 1010, and a submission item 1012, the selection of which causes an offer to be electronically submitted. In some embodiments, the terms of an offer are displayed to the offering user for confirmation after selection of the submission item 1012, but before the electronic submission. If the terms are as intended by the offering user, the offering user selects a confirmation item and the offer is then electronically submitted. In some embodiments, the confirmation is made within a popup user interface, such as a message box. In other embodiments, the confirmation is made within another user interface.

In some embodiments, a user who has already used the user interface 1000 to submit an offer for an item cannot use the user interface 1000 to submit another offer for the same item. In such embodiments, a query is made against an offer database to determine if an identified user has previously made an offer on the listed item. In other embodiments, the user interface 1000 allows a user to make more than one offer on a listed item, but only if the previous offers have been rejected or rescinded.

Figure 11:
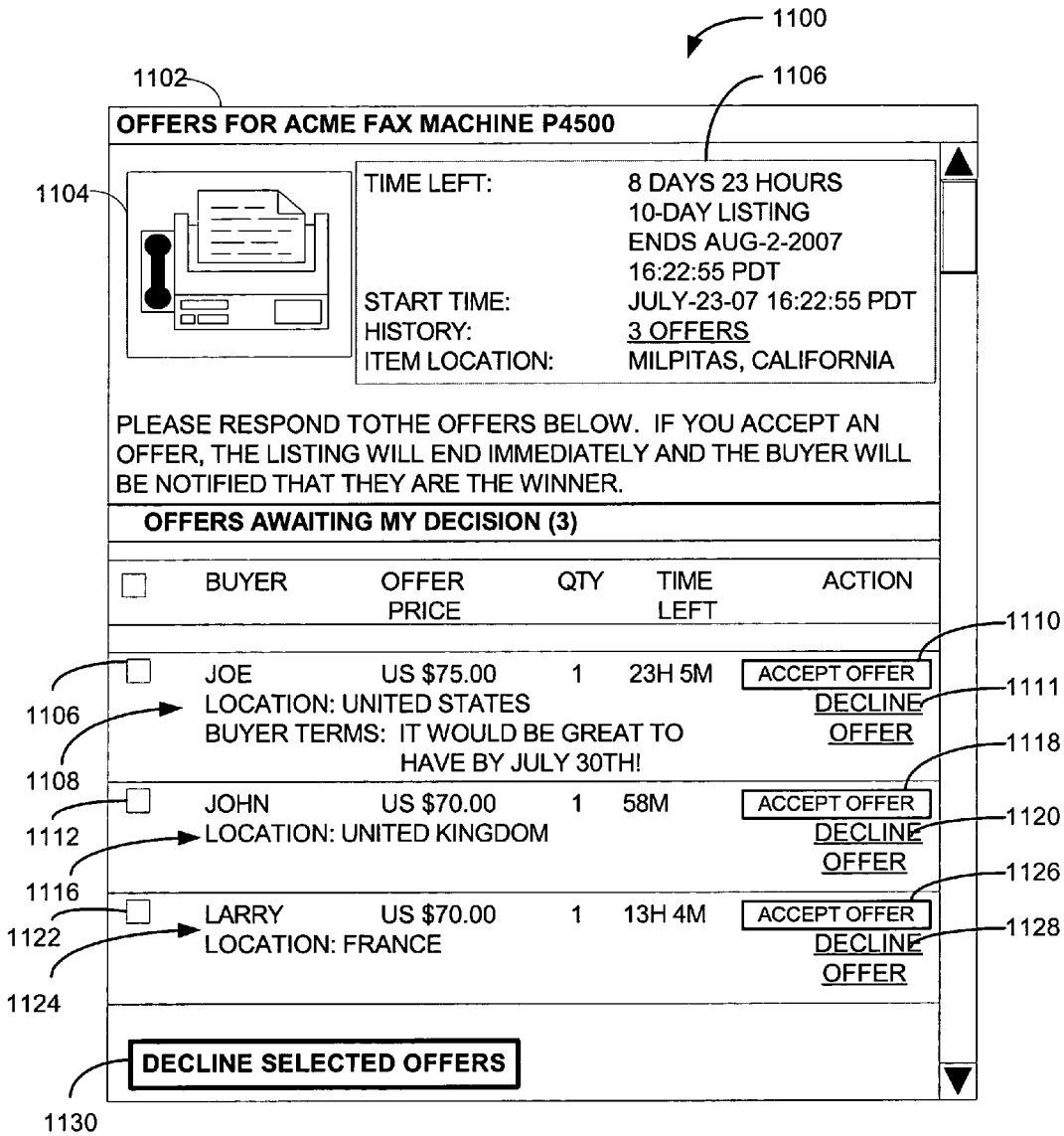
FIG. 11 is a block diagram of a user interface according to one example embodiment of the present invention.

FIG. 11 is a block diagram of a user interface 1100 according to one example embodiment of the present invention. The user interface 1100 provides listing users a view of received offers for one or more listings and the ability to accept and reject the received offers. The user interface 1100 includes a title 1102 and listing information such as a picture 1104 of the item and details of the listing 1106. The user interface 1100 further includes offers 1108, 1116, and 1124 and offer information such as price, quantity of the listed item desired within an offer, and time remaining before the offer expires. The user interface also includes a selection item 1106, 1112, and 1122 for each offer that, when selected, indicates the user is declining, or rejecting, the selected offers. Once the selection items 1106, 1112, and 1122 are selected for offers to decline, a user then selects the submission item 1130 to decline the selected offers. The user interface 1100 further includes accept offer items 1110, 1118, and 1126 and decline offer items 1111, 1120, and 1128, that, when selected, accept or decline an individual offer.

Figure 12:
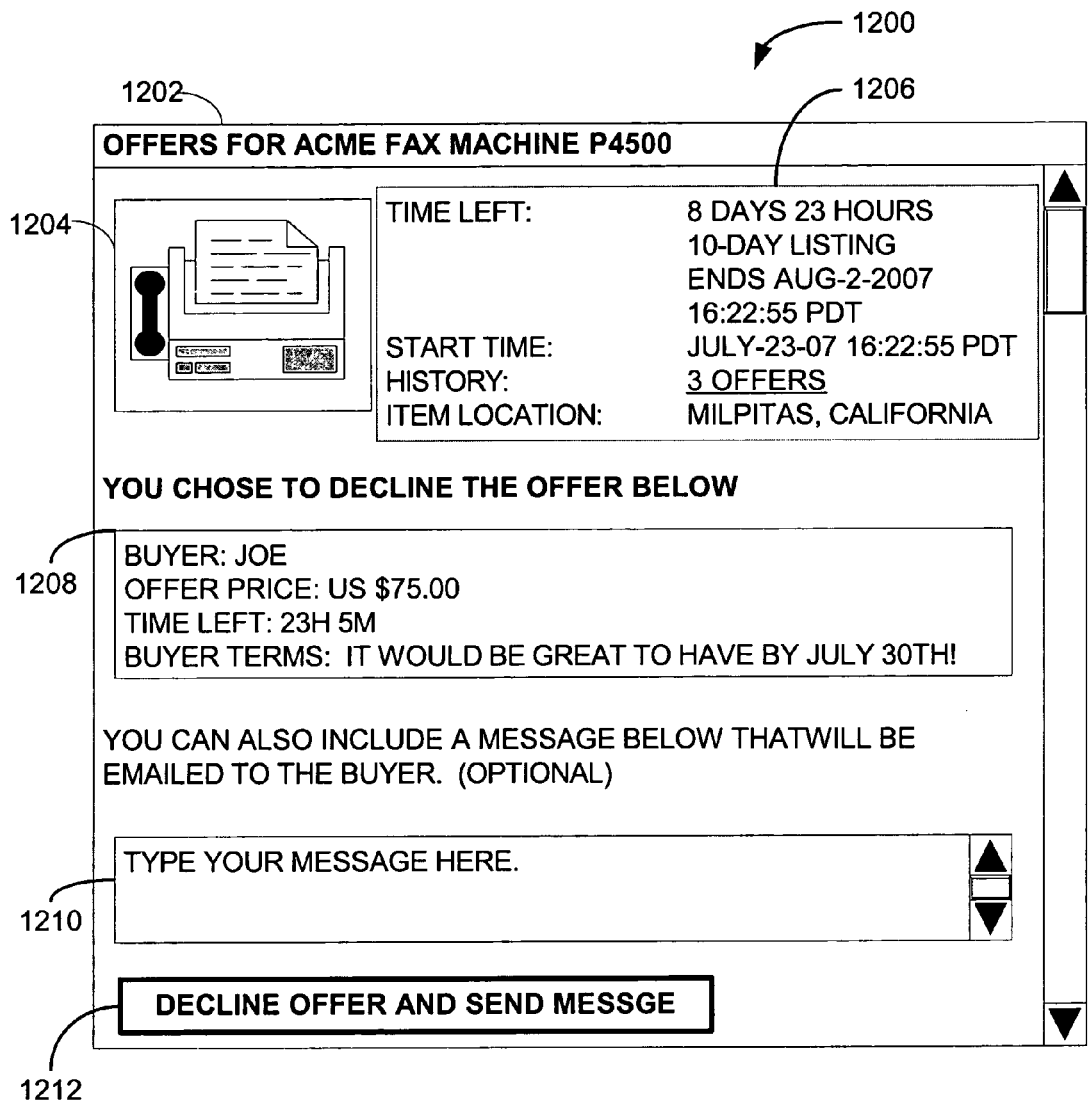
FIG. 12 is a block diagram of a user interface according to one example embodiment of the present invention.

FIG. 12 is a block diagram of a user interface 1200 according to one example embodiment of the present invention. The user interface 1200 is used by sellers in declining offers received from buyers. The user interface 1200 includes a title 1202 and listing information such as a picture 1204 of the item and details of the listing 1206. The user interface 1200 also includes the details of a particular offer 1208, a text box 1210 for entering a message for transmission to the offering buyer along with a notice that the offer was declined, and a submission item 1212 for submitting the decline of the offer and any message entered within the text box 1210.

Figure 13:
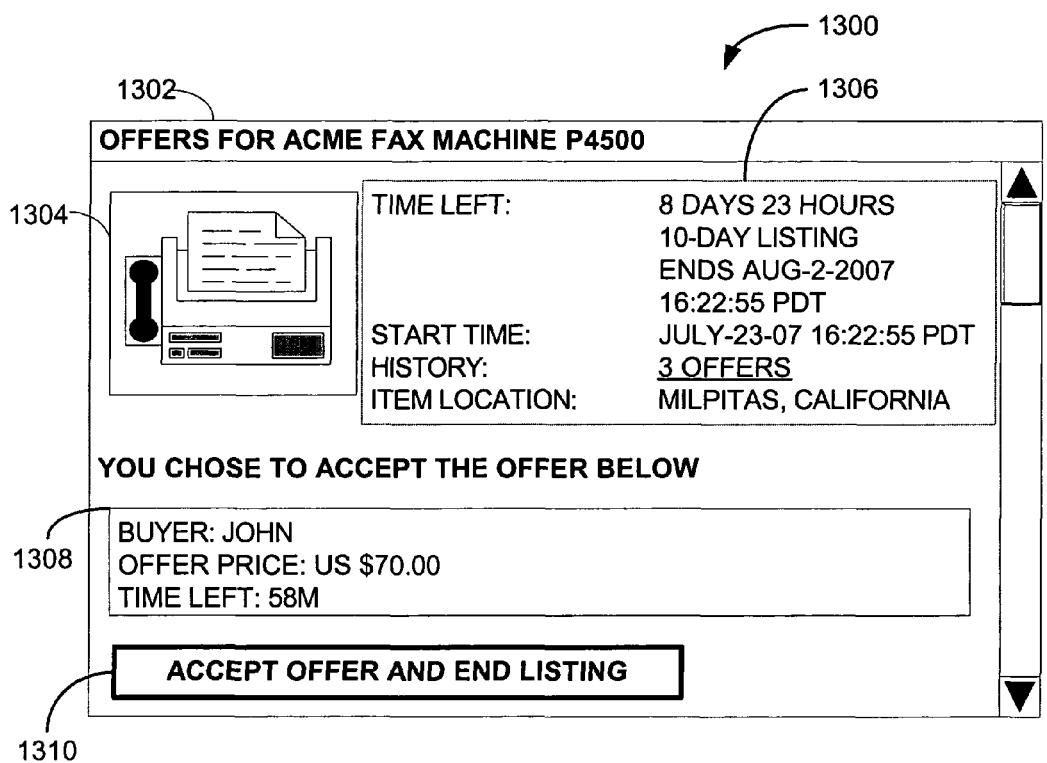
FIG. 13 is a block diagram of a user interface according to one example embodiment of the present invention.

FIG. 13 is a block diagram of a user interface 1300 according to one example embodiment of the present invention. The user interface is used by sellers in accepting offers received from buyers. The user interface 1300 includes a title 1302 and listing information such as a picture 1304 of the item and details of the listing 1306. The user interface also includes the details of a particular offer 1308 and a submission item 1310 to cause the user interface 1300 to submit the acceptance of the offer to the offering buyer.

Thus, network-based commerce facility offer management methods and systems have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for electronic listing within a commerce system, the method including:
    creating a seller listing for a quantity of an item for sale, the listing including an offer option for a buyer to make an offer for the item and an auction option for the buyer to make a bid for the item;
    posting the seller listing on the commerce system, the seller listing being accessible via a network to which the commerce system is coupled;
    receiving, at the commerce system and via the network, an offer from each of one or more potential buyers for the item;
    providing, via the network to the seller, a user interface to receive input with regard to received offers, the user interface adapted to receive input with regard to each offer including:
        an option to accept, reject, or ignore the individual offers received, wherein ignored best offers expire after a period; and
        a text field to receive text to be included with a notice to the respective potential buyer that the pending best offer is rejected or accepted;
    receiving via the user interface, at the commerce system and via the network, from the seller, an acceptance of one or more of the offers; and
    automatically ending the item offered for sale if the number of accepted offers is equal to the quantity of the item for sale.

2. The method of claim 1, including preventing a potential buyer from making more than a specified number of offers for the seller listing.

3. The method of claim 2, wherein the specified number of offers is one (1).

4. The method of claim 1, wherein an offer received from a day buyer includes additional terms, wherein acceptance of the offer binds the seller and the buyer to the additional terms.

5. The method of claim 1, further comprising:
    generating an electronic communication to the seller upon posting of the seller listing on the commerce system, the electronic communication confirming the posting was successful;
    generating an electronic communication to a buyer upon receipt of an offer from the buyer, the electronic communication confirming the offer was successfully received by the commerce system;
    generating an electronic communication to the seller upon receipt of the offer from the buyer, the electronic communication notifying the seller of the offer; and
    generating an electronic communication to the buyer upon acceptance or rejection of the buyer's offer, the electronic communication notifying the buyer of the acceptance or rejection of the buyer's offer.

6. The method of claim 5, wherein generating the electronic communications comprises automated generation and sending of email.

7. The method of claim 1, wherein the offers received from each of the one or more buyers expire after a period of time.

8. The method of claim 7, wherein the period of time is 48 hours.

9. A non-transitory computer-readable medium, with instructions thereon which when processed cause a computer to:
    create a seller listing for a quantity of an item for sale, the listing including an offer option for a buyer to make an offer for the item and an auction option for the buyer to make a bid for the item;
    post the seller listing on the commerce system, the seller listing being accessible via a network to which the commerce system is coupled;
    receive, at the commerce system and via the network, an offer from each of one or more potential buyers for the item;
    providing, via the network to the seller, a user interface to receive input with regard to received offers, the user interface adapted to receive input with regard to each offer including:
        an option to accept, reject, or ignore the individual offers received, wherein ignored best offers expire after a period; and a text field to receive text to be included with a notice to the respective potential buyer that the pending best offer is rejected or accepted;

receive via the user interface, at the commerce system and via the network, from the seller, an acceptance of one or more of the offers; and automatically end the item offered for sale if the number of accepted offers is equal to the quantity of the item for sale.

10. The computer-readable medium of claim 9, with further instructions thereon which when processed cause the computer to prevent a potential buyer from making more than a specified number of offers for the seller listing.

11. The computer-readable medium of claim 10, wherein the specified number of offers is one (1).

\* \* \* \* \*